United States Patent [19]

Heilig et al.

[11] 4,027,834

[45] June 7, 1977

[54] MISSILE NOZZLE CONFIGURATION

[75] Inventors: Louis F. Heilig, Corona del Mar; Alson C. Frazer, Santa Ana, both of Calif.

[73] Assignee: Ford Aerospace & Communications Corporation, Dearborn, Mich.

[22] Filed: Apr. 13, 1964

[21] Appl. No.: 359,222

[52] U.S. Cl. .................................. 244/3.11; 102/3; 244/3.15; 244/3.16

[51] Int. Cl.$^2$ ........................................ F41G 7/00

[58] Field of Search ................. 244/14, 14.1, 14.3, 244/14.4, 14.5, 14 A–14 D, 14 H, 3.11, 3.15, 3.16; 102/3; 60/35.6 N

[56] References Cited

UNITED STATES PATENTS

| | | | |
|---|---|---|---|
| 2,397,088 | 3/1946 | Clay | 102/3 |
| 2,404,942 | 7/1946 | Bedford | 102/3 |
| 3,200,586 | 8/1965 | Ernest | 60/35.6 N |
| 3,205,657 | 9/1965 | Tumavicus | 60/35.6 N |

*Primary Examiner*—Malcolm F. Hubler
*Attorney, Agent, or Firm*—Robert D. Sanborn

EXEMPLARY CLAIM

1. In a guiding and propulsion system for a missile, the combination which comprises:
   communication means mounted in a central portion of the missile toward the aft end thereof and effective to receive and emit radiant energy along a rearward line of view substantially axial of the missile, to guide the missile, and
   nozzle means mounted on said aft end to propel the missile by generally rearward discharge of fluid, said nozzle means being canted outward from said central portion to keep said line of view free from said fluid.

8 Claims, 4 Drawing Figures

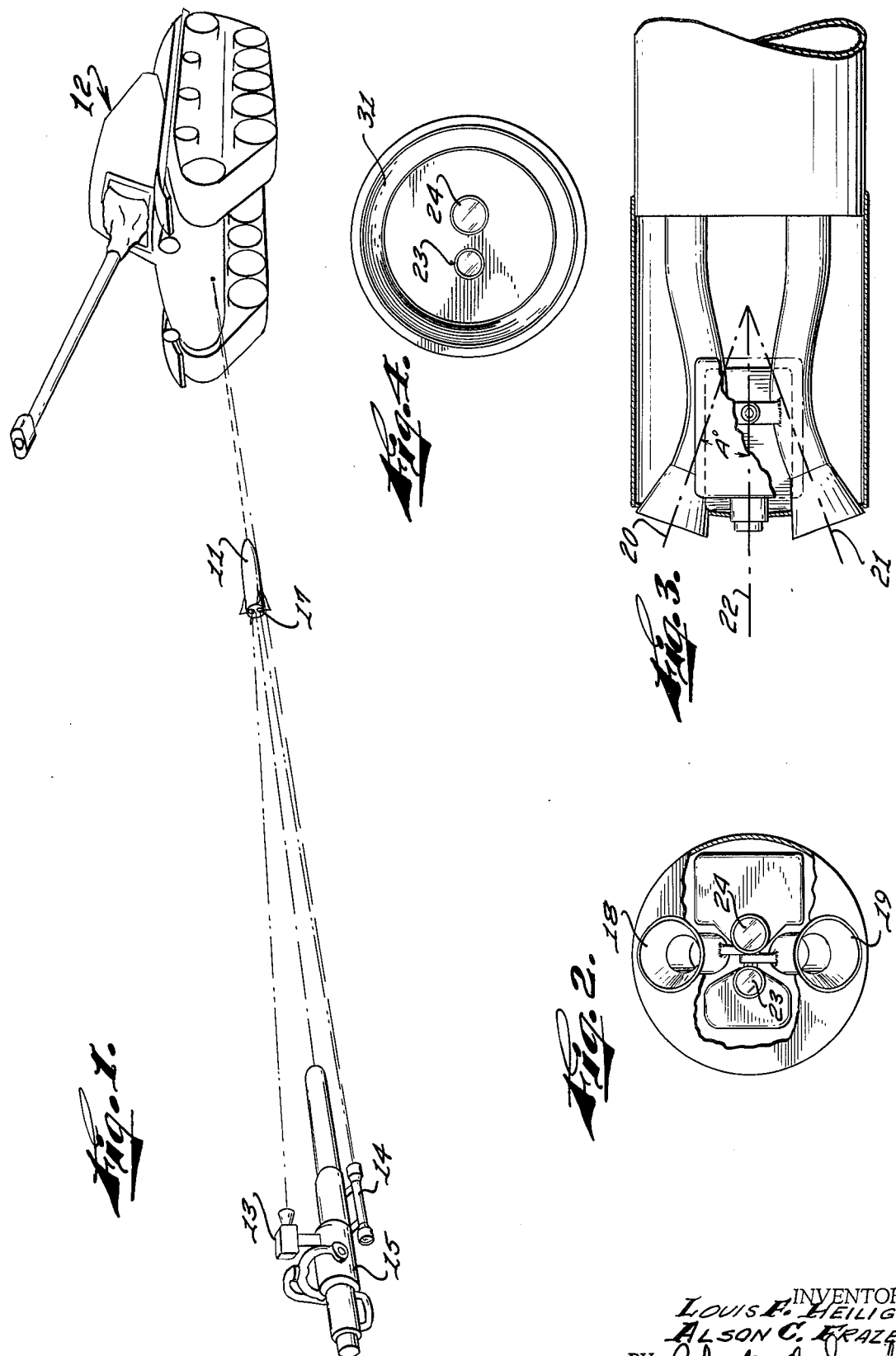

MISSILE NOZZLE CONFIGURATION

This invention relates to missile nozzle configurations and more particularly to a nozzle configuration employing canted nozzles.

In systems for guiding missiles toward a target from a stationary or moving control source by means of a communication link between the source and the missile it is advantageous to locate the missile components of the link in the aft end of the missile since the missile's line of sight is usually directly away from the guidance source. In one such control system wherein a missile is guided from a vehicle to a target by means of an infrared communication link it is necessary that the missile infrared components be located at the aft end of the missile near the center line of the missile. It is also necessary that the outside interference such as caused by exhaust gases from the missile nozzle be reduced to a minimum. Since the missile nozzle must also be located at the aft end of the missile some means must be included to remove the nozzle exhaust gases from the communication link extending along the center line of the missile.

In weapons guidance systems heretofore proposed the missile nozzle configuration has consisted of nozzles which extend substantially in line with the missile center line. Such a configuration produces exhaust gases which seriously interfere with the communication link between the missile and the control source. In a missile guidance system utilizing an infrared command link the close proximity of the stream of thrust exhaust gases creates noise and attenuation of command signals from the control source which so seriously affect the communication link as to make the system inoperable. Because of these problems infrared systems which will tolerate little interference have not been employed in prior art systems. Accordingly, it is an object of this invention to provide a missile nozzle configuration for discharging exhaust gases away from the center line of the missile.

The device of this invention provides a missile nozzle configuration which exhausts thrust gases from a missile away from the missile center line. In this manner, the center line of the missile is free from propellant exhaust gases allowing the communication link components of the guidance and control system to be located near the center line of the aft end of the missile.

The new nozzle configuration also facilitates incorporation of nozzles of required length, as well as provision of proper accuracy of thrust, in a missile of given size and speed.

It is therefore another object of this invention to provide a missile nozzle configuration having canted nozzles.

It is still another object of this invention to provide a missile nozzle configuration for discharging exhaust gases away from the center line of the missile.

It is a further object of this invention to provide a missile nozzle configuration for freeing the field of view of the guidance and control link along the missile center line.

Other objects of invention will become apparent from the following description read in conjunction with the accompanying drawings, in which:

FIG. 1 is a diagrammatic view of a missile in flight being guided toward a target, FIG. 2 is a view from the rear of the aft end of the missile utilizing the nozzle configuration of one aspect of the invention.

FIG. 3 is a side view of the nozzle configuration of FIG. 2, and

FIG. 4 is another aspect of the invention illustrating an annular nozzle configuration.

According to a principal aspect of the invention a guided missile is continuously guided from a vehicle to a target by means of an infrared tracker command link between the vehicle and the missile. The missile components of the link are located in the aft end of the missile near the center line of the missile. Tracking and command is provided between the vehicle and the missile along a field of view near the center line of the missile. A missile nozzle configuration is provided in the missile comprising a plurality of nozzles adapted to receive primary thrust gases from a rocket motor in the missile. Each of the nozzles has its center line canted outward from the center line of the missile exhausting thrust gases away from the center line of the missile. In this manner, the missile components of the infrared link located between the nozzles near the center line of the missile have their field of view free from the disturbances created by exhaust gases from the nozzles.

According to another aspect of the invention the missile nozzle configuration is a single nozzle of annular configuration whose direction of discharge is canted outward from the center line of the missile.

Referring now to the drawing, and in particular to FIG. 1, there is illustrated a missile command control system for guiding a missile from a vehicle gun barrel to a ground target utilizing infrared command links. The missile 11 is guided toward a target 12 by control means 13 and 14 on a vehicle 15. A communication link which may be for example infrared is established between the vehicle 15 and the missile 11 with infrared signals being transmitted and received from the vehicle and the missile between the control 13 and 14 and the missile link components 17 which are located as near the center line of the missile 11 as practicable for better guidance and control. It is essential in the guidance system of FIG. 1 that the field of view between the vehicle 15 and the missile 11 along the center line of the missile 11 be kept as free as possible from interfering elements such as exhaust gases from the rocket motors of the missile 11.

Referring now to FIGS. 2 and 3, there is illustrated a view of the missile 11 of FIG. 1 in which a canted missile nozzle configuration is shown for exhausting thrust gases from the missile 11. The nozzle configuration may employ a pair of nozzles 18 and 19 mounted on the aft end of the missile, symmetrically to its center, and connected to receive thrust gases from a rocket motor (not shown) in the missile 11. The nozzles 18 and 19 have center lines 20 and 21 canted outward from the center line on thrust axis 22 of the missile 11 by an angle A. The nozzles 18 and 19 may be structurally joined.

The missile components of the infrared link of FIG. 1 which may be for example a missile source and a missile receiver may be located near the center line 22 of the missile 11 as illustrated in the view of FIG. 2 wherein a missile receiver 23 and a missile transmitter 24 are located near the missile center line 22. The field of view of the components 23 and 24 is maintained free of exhaust gases from the nozzles 18 and 19 with exhaust gases flowing along the lines 20 and 21 away from the missile center line 22. In this manner the field of view is protected from disturbances caused by the exhaust gases.

The nozzles 18 and 19 preferably are canted outward at an acute angle between 15 and 25 degrees, an angle A of approximately 20° degrees being found to be ideal in one embodiment of the invention. The canting of the nozzles 18 and 19 serves to reduce the missile length occupied by the length of the nozzles 18 and 19.

Referring now to FIG. 4, there is illustrated an aspect of the invention in which the missile nozzle configuration of the missile 11 comprises a single nozzle 31 which is annular about the center line of the missile 11 with the nozzle discharge being canted outward. The thrust gases from the nozzle 31 are thus symmetrically exhausted.

The missile configuration of the invention is applicable to as few as two nozzles as illustrated in the aspect of FIGS. 2 and 3 but may also be extended to cover multiple nozzles up to and including essentially an infinite number of nozzles represented by the annular configuration of the aspect of FIG. 4. Current test data have verified the adequacy and advantages of up to 6, 12 and the annular nozzle specimens.

While the primary benefit of a canted nozzle configuration according to the invention is the disbursement of the propellant smoke from the optical line of sight between the ground control and the missile therefore minimizing attenuation of command signals and infrared noise of the exhaust gases, an important secondary benefit arises from the fact that the line of thrust of the canted nozzles is away from the center line of the missile. In this manner a reduction in the required accuracy of nozzle alignment relative to the missile center line is realized because of the inherent thrust direction of each of the nozzles which therefore contribute only a percentage of the total thrust. Additionally, the multi-nozzle canted configuration offers significant packaging advantages particularly where the missile components must be located in the base area.

Although the invention has been described and illustrated in detail, it is to be clearly understood that the same is by way of illustration and example only and is not taken by way of limitation, the spirit and scope of this invention being limited only by the terms of the appended claims.

We claim:
1. In a guiding and propulsion system for a missile, the combination which comprises:
communication means mounted in a central portion of the missile toward the aft end thereof and effective to receive and emit radiant energy along a rearward line of view substantially axial of the missile, to guide the missile, and
nozzle means mounted on said aft end to propel the missile by generally rearward discharge of fluid, said nozzle means being canted outward from said central portion to keep said line of view free from said fluid.

2. A combination as described in claim 1 wherein the nozzle means comprises an annular nozzle surrounding said central portion.

3. A combination as described in claim 2 wherein the annular nozzle is canted outwardly at an angle between 15° and 25° with respect to the center line of the missile.

4. In a guiding and propulsion system for a missile, the combination which comprises:
communication means mounted in a central portion of the missile toward the aft end thereof and effective to receive and emit radiant energy along a rearward line of view substantially axial of the missile, to guide the missile, and
a plurality of gas discharge nozzles mounted on said aft end for generally rearward discharge of gas to propel the missile, each nozzle being canted outward from said central portion to keep said line of view free from said gas.

5. A combination as described in claim 4 wherein said communication means is constructed and arranged to receive and emit infrared energy.

6. A combination as described in claim 4 wherein said plurality of nozzles comprises a pair of nozzles mounted on said aft end symmetrically to the center thereof.

7. A combination as described in claim 4 wherein said nozzle is canted outward at an acute angle with respect to the center line of the missile.

8. A combination as described in claim 4 wherein each nozzle is canted outward at an angle of approximately 20° with respect to the center line of the missile.

* * * * *